(12) United States Patent
Nishiyama et al.

(10) Patent No.: US 11,858,607 B2
(45) Date of Patent: Jan. 2, 2024

(54) ANGLE CHANGEABLE APPARATUS AND OAR

(71) Applicant: KUWANO BOATS CO., LTD., Shiga (JP)

(72) Inventors: Shingo Nishiyama, Shiga (JP); Tetsushi Ozawa, Shiga (JP)

(73) Assignee: KUWANO BOATS CO., LTD., Shiga (JP)

( * ) Notice: Subject to any disclaimer, the term of this patent is extended or adjusted under 35 U.S.C. 154(b) by 0 days.

(21) Appl. No.: 17/629,667

(22) PCT Filed: Aug. 27, 2020

(86) PCT No.: PCT/JP2020/032491
§ 371 (c)(1),
(2) Date: Jan. 24, 2022

(87) PCT Pub. No.: WO2022/044239
PCT Pub. Date: Mar. 3, 2022

(65) Prior Publication Data
US 2023/0192256 A1    Jun. 22, 2023

(51) Int. Cl.
*B63H 16/04* (2006.01)
(52) U.S. Cl.
CPC .................................. *B63H 16/04* (2013.01)
(58) Field of Classification Search
CPC .................................................... B63H 16/04
See application file for complete search history.

(56) References Cited

U.S. PATENT DOCUMENTS

| | | | | |
|---|---|---|---|---|
| 1,958,008 A | * | 5/1934 | Macdougall | B63H 16/04 440/102 |
| 4,605,378 A | * | 8/1986 | Hamilton | B63H 16/04 440/102 |
| 5,127,859 A | * | 7/1992 | Rantilla | B63H 16/107 D12/302 |

(Continued)

FOREIGN PATENT DOCUMENTS

| | | |
|---|---|---|
| CN | 205256642 U | 5/2016 |
| JP | 41-18624 B1 | 10/1966 |

(Continued)

OTHER PUBLICATIONS

Decision to Grant a Patent dated Jul. 13, 2021 for corresponding Japanese Patent Application No. 2021-529684.

*Primary Examiner* — S. Joseph Morano
*Assistant Examiner* — Jovon E Hayes
(74) *Attorney, Agent, or Firm* — Rankin, Hill & Clark LLP (57) ABSTRACT

The present invention provides an angle changeable apparatus and an oar such that the shaft angle is easily adjustable. Disclosed is an angle changeable apparatus 1 for variably changing an angle of a shaft 110 inserted in a sleeve 10, including: a shaft-side member 20 fixed to the shaft 110; a sleeve-side member 30 fixed to the sleeve 10; and a slider 40 configured to slide between the shaft-side member 20 and the sleeve-side member 30, wherein the shaft-side member 20 has a first guiding part extending in a shaft direction, the sleeve-side member 30 has an elongated hole 31 extending in an oblique direction relative to the shaft direction, the slider 40 has a groove 41c guided by the first guiding part and a slider main body 41 guided by the elongated hole 31.

6 Claims, 11 Drawing Sheets

(56) References Cited

U.S. PATENT DOCUMENTS

| | | | | |
|---|---|---|---|---|
| 5,215,482 A | * | 6/1993 | Henry | B63H 16/10 |
| | | | | 440/103 |
| 7,731,637 B2 | * | 6/2010 | D'Eredita | A63B 21/154 |
| | | | | 482/92 |
| 7,862,484 B1 | * | 1/2011 | Coffey | A63B 21/157 |
| | | | | 482/72 |
| 9,033,753 B2 | * | 5/2015 | Siverts | B63H 16/04 |
| | | | | 114/39.22 |
| 2013/0101418 A1 | | 4/2013 | McClain | |
| 2014/0109283 A1 | * | 4/2014 | Burgess, Jr. | B60K 8/00 |
| | | | | 415/170.1 |
| 2015/0094156 A1 | * | 4/2015 | Cordell | B25G 3/38 |
| | | | | 464/182 |
| 2018/0352794 A1 | * | 12/2018 | Shiflett, Jr. | A01K 97/10 |
| 2019/0315447 A1 | | 10/2019 | Ratter | |

FOREIGN PATENT DOCUMENTS

| | | |
|---|---|---|
| JP | 48-20191 U | 3/1975 |
| JP | 51-68995 U | 5/1976 |
| JP | 53-76497 U | 6/1978 |

* cited by examiner

ANGLE CHANGEABLE APPARATUS AND OAR

TECHNICAL FIELD

The present invention relates to an angle changeable apparatus and an oar.

BACKGROUND ART

Rowing oars (see Japanese Patent Application Publication No. 2019-137205) are each used while inserted through a rowlock (oarlock, oar receiver) rotatably attached to a rigger on the boat (hull) side (see Japanese Patent Application Publication No. 2008-80890). Then, a rotating shaft part of the rowlock is in press contact with the back face side of a sleeve fixed to the oar during rowing so as to make the boat move forward. The back face of the sleeve refers to a surface opposite to the front surface of a blade.

Here, the blade angle (blade pitch) is adjusted, in many cases, to be somewhat inclined forward relative to the vertical direction. The forwardly inclined state means a state in which the upper end side of the blade is somewhat inclined rearward in the traveling direction while the back face of the sleeve is in press contact with the rotating shaft part of the rowlock. The blade angle affects the stability of the blade under water, and is typically adjusted on the forwardly inclined side in the range of 3 to 6 degrees by every 0.5 degrees.

CITATION LIST

Patent Literature

Patent Literature 1: Japanese Patent Application Publication No. 2019-137205
Patent Literature 2: Japanese Patent Application Publication No. 2008-80890

SUMMARY OF INVENTION

Technical Problem

Meanwhile, when the blade (shaft) angle between the sleeve and the rowlock was adjusted, the back face of the synthetic resin-made sleeve was machined on land to adjust the press contact angle of the sleeve relative to the rowlock. Thus, the sleeve machining should require time.

Here, the present invention addresses the problem of providing an angle changeable apparatus and an oar such that the shaft angle is easily adjustable.

Solution to Problem

As a solution to the above problem, the present invention provides an angle changeable apparatus for variably changing an angle of a shaft inserted in a sleeve, including: a shaft-side member fixed to the shaft; a sleeve-side member fixed to the sleeve; a slider configured to slide between the shaft-side member and the sleeve-side member, wherein one of the shaft-side member or the sleeve-side member has a first guiding part extending in a shaft direction, the other of the shaft-side member or the sleeve-side member has a second guiding part extending in an oblique direction relative to the shaft direction, the slider has a first guided part guided by the first guiding part and a second guided part guided by the second guiding part, and when the slider slides, the shaft-side member and the sleeve-side member are subject to relative rotation so that an angle of the shaft relative to the sleeve is changeable.

Here, the wording "second guiding part extending in an oblique direction relative to the shaft direction" includes a form in which the second guiding part is part of spiral extending in the shaft direction as described in an embodiment described later.

In such a configuration, when the slider slides, the shaft-side member and the sleeve-side member are subject to relative rotation so that the angle of the shaft relative to the sleeve is changeable. This makes it possible to easily adjust the angle of the shaft relative to the sleeve.

In addition, the invention may be configured such that the one is the shaft-side member; the first guiding part is a projected section extending in the shaft direction while protruded radially outward; the first guided part is a groove fit for the first guiding part; the other is the sleeve-side member; the second guiding part is an elongated hole formed at the sleeve-side member in an oblique direction; and the second guided part is slidably inserted in the elongated hole.

Such a configuration allows for relative rotation between the shaft-side member and the sleeve-side member when the slider slides while the projected section (first guiding part) on the shaft-side member fits the groove (first guided part) of the slider and the elongated hole (second guiding part) of the sleeve-side member fits the second guided part.

In addition, each inner surface of the elongated hole in the shaft direction extends in a circumferential direction. Thus, each end face of the first guiding part may be configured to be slidably in contact with the corresponding inner surface in the circumferential direction.

Such a configuration causes each end face of the first guiding part to be slidably in contact with the corresponding inner surface of the elongated hole in the shaft direction. Accordingly, the sleeve-side member is positioned to the shaft-side member in the shaft direction.

Also, the invention may further include a sleeve having a window section extending in the shaft direction and fixed outwardly on the sleeve-side member, wherein the slider has a grip part that protrudes radially outward relative to an outer periphery thereof and faces the outside through the window section.

In such a configuration, the grip part faces the outside through the window section, so that the grip part can be gripped from the outside. Thus, the slider can be made to slide.

The invention may further include: a rack extending in the shaft direction relative to the slider and having a rack gear; and a pinion having a pinion gear engaged with the rack gear.

In such a configuration, when the pinion rotates, the slider can slide via the rack.

As a solution to the above problem, the invention provides an oar including: the above angle changeable apparatus; a shaft having the shaft-side member attached; and a blade fixed to a leading end of the shaft.

In each configuration, the angle changeable apparatus can be used to easily adjust the angle of the blade relative to the sleeve.

Advantageous Effects of Invention

The invention can provide an angle changeable apparatus and an oar such that the shaft angle is easily adjustable.

DESCRIPTION OF EMBODIMENTS

An embodiment of the invention will be described with reference to FIGS. 1 to 6D. As used herein, the front face side of a blade 120 is set to the front side. The references are given as "Front, Rear, Left, Right, Up, and Down" in FIG. 2. An oar 100 in FIG. 2 is a stroke side (right side when viewed from a rower) oar used for a rowing boat. The blade 120 is used for paddling while made to stand in a vertical direction. The "front side" is a front surface (front face) side of the blade 120; and the "rear side" is the rear surface (back face) side of the blade 120 and the "boat traveling side". The oar 100 may be any one of a scull oar or a sweep oar.

<<Oar Configuration>>

Figure 1:
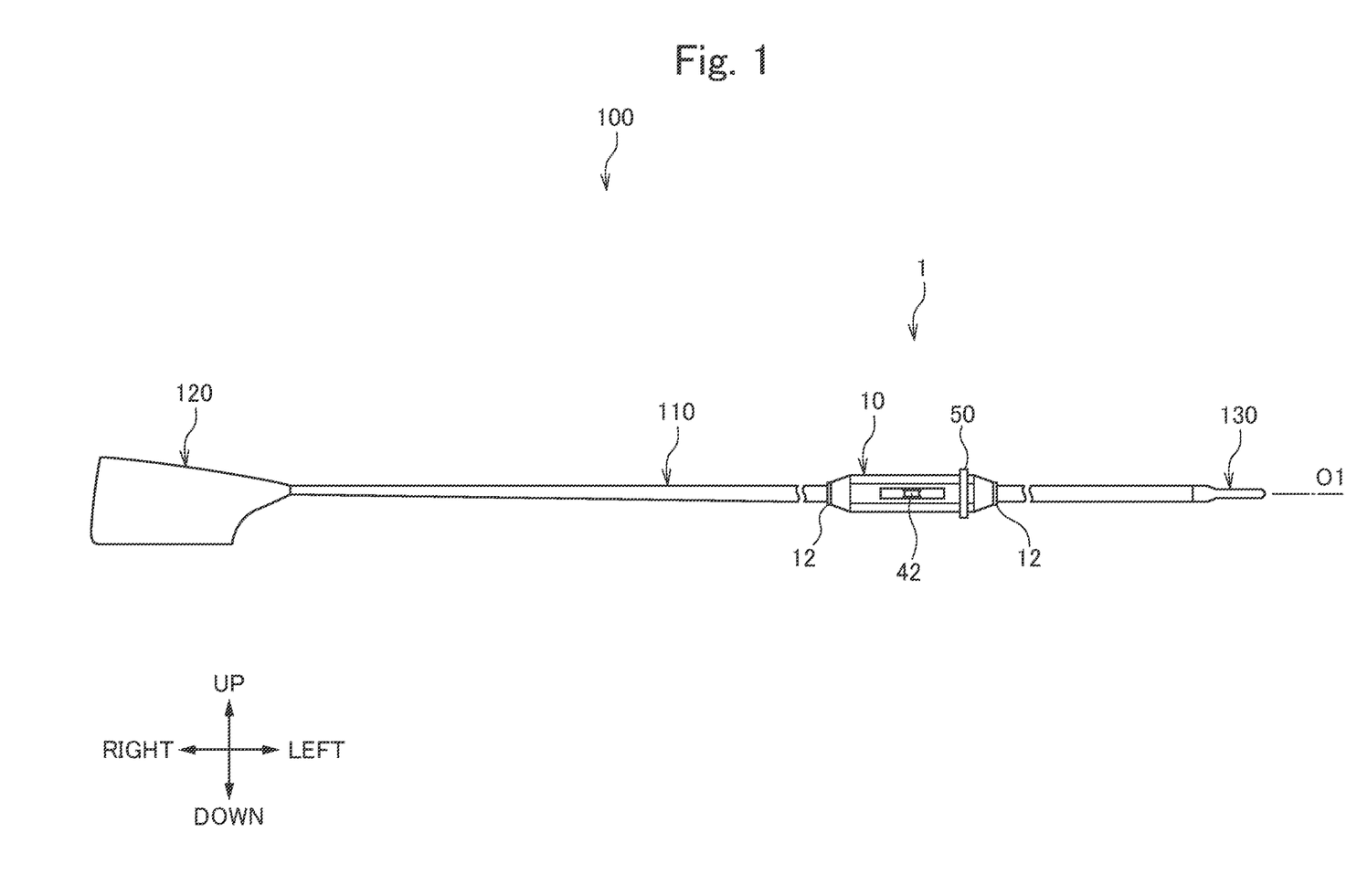
FIG. 1 is a front view of an oar according to an embodiment of the invention.
Figure 2:
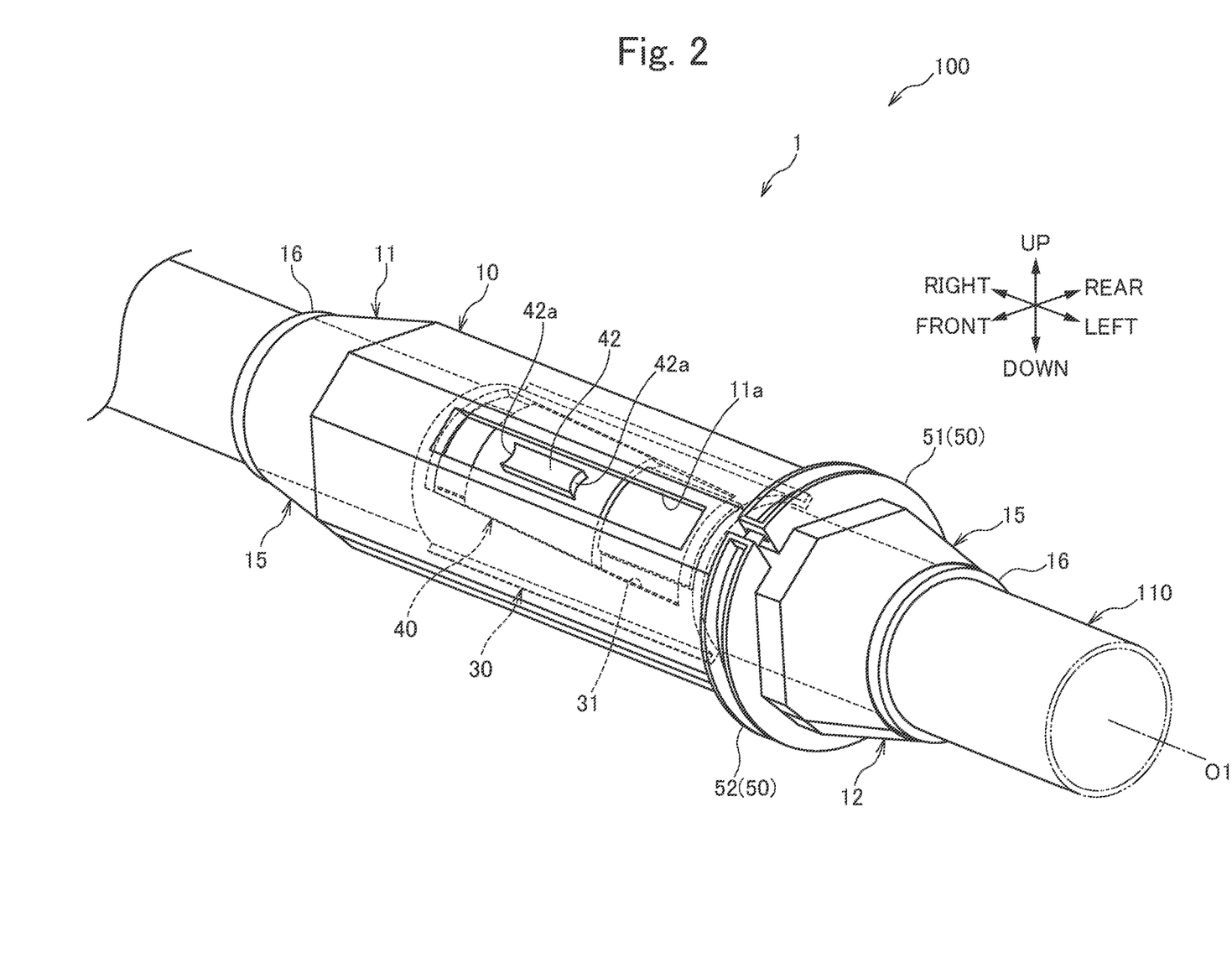
FIG. 2 is a perspective view of an angle changeable apparatus according to an embodiment of the invention.

FIG. 1 shows that the oar 100 includes: a long narrow shaft 110; a blade 120 fixed to the leading end side (right end side) of the shaft 110; a handle 130 fixed to the base end side (left end side) of the shaft 110; and an angle changeable apparatus 1 fixed to the slightly base end side of the shaft 110.

The shaft 110 is an elongated cylinder extending along the shaft line O1 in a left-to-right direction, and made of FRP such as CFRP (Carbon Fiber Reinforced Plastic) or GFRP (Glass Fiber Reinforced Plastic). The blade 120 is a paddling part and is a wide plate-shaped body. As used herein, a blade width direction line O2 is set which extends in the widthwise direction of the blade 120 and intersects the shaft line O1 (see FIG. 5). The handle 130 is a part gripped by a rower.

Such an oar 100 can be used while inserted in a rowlock 200 (see FIG. 5) and is operated using the rowlock 200 as a pivot. The rowlock 200 is shaped like a letter U. Its rotating shaft part 210 has a straight pin 220 inserted and extending vertically. Accordingly, the rowlock 200 is rotatably supported using the straight pin 220 as a pivot. The lower end of the straight pin 220 is fixed via a rigger (not shown) to a boat (not shown). The straight pin 220 is generally used while somewhat tilted. Here, to make the description simple, a vertically extending structure is exemplified.

<<How Angle Changeable Apparatus is Configured>>

As illustrated in FIGS. 2 to 6D, the angle changeable apparatus 1 is an apparatus in which the angle of the shaft 110 (blade 120) relative to the sleeve 10 (rowlock 200) is changeable. The angle changeable apparatus 1 includes: a substantially rectangular tube-shaped sleeve 10; a shaft-side member 20; a sleeve-side member 30; a slider 40; and a collar 50.

<Sleeve>

The sleeve 10 is shaped like a rectangular tube. The shaft 110 is inserted into the inside. The sleeve 10 is a part supported by the rowlock 200 (see FIG. 5). The sleeve 10 includes a first half 11 provided on the front upper side and a second half 12 provided on the rear lower side.

The first half 11 and the second half 12 each have an approximately ½ cylindrical shape. The engaged surface is set along an obliquely rising surface that rises obliquely as the distance to the rear side becomes shorter. The state in which the first half 11 and the second half 12 are combined is maintained via a bolt(s) and a nut(s) (not shown) used for securing both.

The rear face 12a of the second half 12 extends vertically. Next, the oar 100 may be operated so as to make the boat move forward, that is, a rower may row the handle 130 rearward (in the boat traveling direction), rear face 12a of the second half 12 is in press contact with the rotating shaft part 210 of the rowlock 200.

Then, while the blade 120, which has been submerged under water, reaches a fixed point, the oar 100 may rotate using the press contact portion as a pivot. This make the boat move forward. Specifically, during the boat forward movement, the rear face 12a of the second half 12 is in press contact with the rotating shaft part 210 of the rowlock 200. Thus, the sleeve 10 is positioned to the rowlock 200 while not rotating in the circumferential direction.

Figure 5:
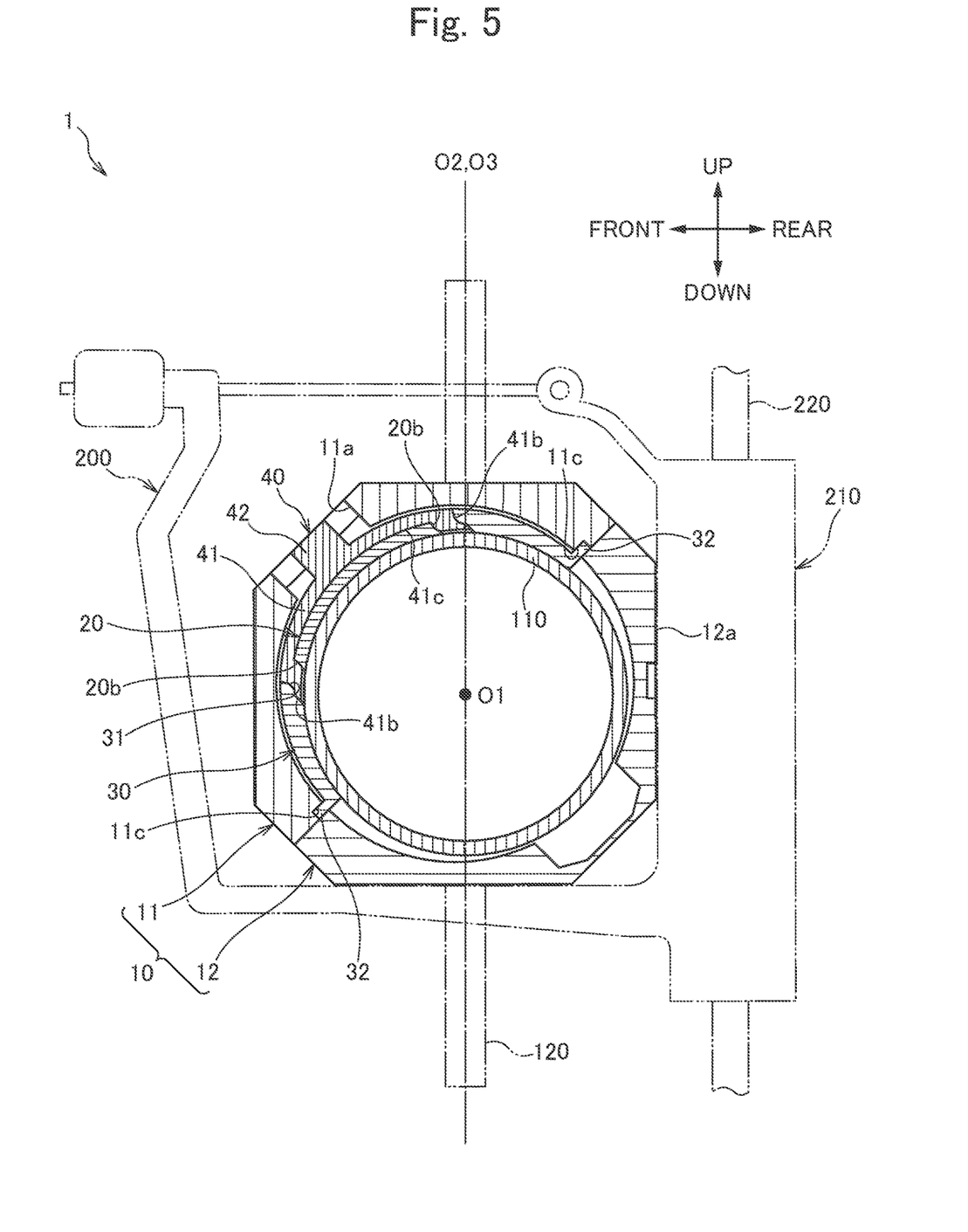
FIG. 5 is a cross-sectional view cut along line X1-X1 of FIG. 4.

As used herein, the reference axis line O3 is set which is in parallel with the rear face 12a and the rotating shaft part 210 and intersects the shaft line O1 (see FIG. 5). Now, the case is illustrated in which in the initial state (at the neutral position of the slider 40), the blade width direction line O2 and the reference axis line O3 are in parallel; and the blade 120 is perpendicular to the water surface.

The obliquely upper front side of the first half 11 is provided with a window section 11a having an elongated hole extending in the shaft direction (left-right direction). An edge of the window section 11a is marked with a scale 11b corresponding the angle of rotation of the shaft 110 (blade 120).

Each cylindrical spacer 16 is provided between the shaft 110 and the corresponding end of the sleeve 10. The spacer 16 is fixed using, for instance, an adhesive to the shaft 110 and is slidably in contact with the corresponding end 15. Then, the thickness of the spacer 16 may be changed, if appropriate. This makes it possible to mount the sleeve 10 to the shaft 110 with a different thickness without modifying the sleeve 10. In addition, the embodiment may be configured such that the spacer 16 is slidably in contact with the sleeve 10 in the shaft direction so that the spacer 16 is positioned to the sleeve 10 in the shaft direction.

<Shaft-Side Member>

The shaft-side member 20 is a member fixed using, for instance, an adhesive onto the circumference surface of the shaft 110, and is an approximately ¼ cylinder having a central angle of about 90 degrees in a cross-sectional view while extending in the shaft direction (left-right direction). Specifically, the shaft-side member 20 itself is a projected section (first guiding part) that protrudes radially outward relative to the circumference surface of the shaft 110 and extends in the shaft direction. Provided that the shape is not limited to the approximately ¼ cylinder. It is possible to freely modify, if appropriate, the shape to, for example, an approximately ½ cylinder. The same applies to a slider main body 41 described below.

Each end face 20a of the shaft-side member 20 in the shaft direction is provided along the circumferential direction. Respective circumferential lateral surfaces 20b of the shaft-side member 20 are in parallel to each other and are provided along the shaft direction.

<Sleeve-Side Member>

The sleeve-side member 30 is a member fixed using, for instance, an adhesive onto the inner periphery of the first half 11, and is an approximately ½ cylinder having a central angle of about 180 degrees in a cross-sectional view while extending in the shaft direction (left-right direction). In other words, the first half 11 (sleeve 10) is fixed to the sleeve-side member 30 on the radially outward side.

The sleeve-side member 30 has an elongated hole 31 (second guiding part) that is inclined relative to the shaft direction and extends in an oblique direction. That is, respective circumferential internal surfaces 31b of the elongated hole 31 are in parallel to each other and extend in the oblique direction. Specifically, the elongated hole 31 (internal surface 31 b) is part of spiral that has a markedly long pitch and extends in the shaft line O1 direction while using the shaft line O1 as a center line. As used herein, the elongated hole 31 is inclined clockwise more as the distance to the leading end side (right side) becomes shorter.

Specifically, the angle of inclination between the oblique direction (lengthwise direction) of the elongated hole 31 and the shaft direction is set to, for instance, more than 0 degrees and 3 degrees or less (0 degrees<oblique direction≤3 degrees, preferably 0.5 degrees<oblique direction≤0.9 degrees). In other words, if the diameter of the shaft 110 is, for example, 45 mm, the distance of 100 mm in the shaft direction is designed to twist the angle by about 3 degrees when viewed in the shaft direction.

In this way, in the case where the angle of inclination is more than 0 degrees and 3 degrees or less, the oblique direction is configured to be substantially perpendicular to the circumferential direction. Accordingly, when circumferential force (rotational force) is applied from the sleeve-side member 30 (sleeve 10), there is an markedly low risk of causing the sleeve-side member 30 (sleeve 10) to rotate. That is, small maintenance force by, for instance, the collar 50 can retain the post-adjustment angle θ (position of the slider 40) as described later.

Note that changing the angle of inclination of the elongated hole 31 can change the angle of relative rotation between the shaft-side member 20 and the sleeve-side member 30 in response to the amount of sliding of the slider 40. That is, as the angle of inclination of the elongated hole 31 becomes larger, it is possible to increase the angle of relative rotation between the shaft-side member 20 and the sleeve-side member 30.

Each inner surface 31a of the elongated hole 31 in the shaft direction is provided along the circumferential direction. Each inner surface 31a is slidably in contact with the corresponding end face 20a of the shaft-side member 20 in the circumferential direction. Due to this, the sleeve-side member 30 cannot be displaced relative to the shaft-side member 20 in the shaft direction.

The width W31 of the elongated hole 31 in the circumferential direction is larger than the width W20 of the shaft-side member 20 (W31>W20). This makes it possible to displace the sleeve-side member 30 relative to the shaft-side member 20 in the circumferential direction.

Specifically, the sleeve-side member 30 is configured to be able to rotate relative to the shaft-side member 20, which has been inserted in the elongated hole 31, in the circumferential direction while the sleeve-side member 30 is restricted by the shaft-side member in the shaft direction.

Both ends of the sleeve-side member 30 in the circumferential direction are each provided with a flange portion 32 protruding radially outward. The flange portion 32 is engaged with a stepped groove 11c formed at the inner periphery of the first half 11 on each side in the circumferential direction. In this way, the sleeve-side member 30 and the first half 11 (sleeve 10) are bonded to each other and are further engaged in the circumferential direction. Thus, the sleeve-side member 30 and the first half 11 (sleeve 10) are not subject to relative rotation. This can cause the sleeve 10 and the sleeve-side member 30 to integrally rotate when the slider 40 slides as described later.

<Slider>

The slider 40 is a member configured to slide between the shaft-side member 20 and the sleeve-side member 30. The slider 40 includes: a slider main body 41 that has a central angle of about 90 degrees in a cross-sectional view and is shaped like an approximately ¼ cylinder extending in the oblique direction; and a grip part 42 that protrudes radially outward relative to the outer periphery of the slider main body 41 and extends in the shaft direction.

<Slider-Slider Main Body>

The slider main body 41 has substantially the same thickness as the sleeve-side member 30, and is a second guided part configured to be guided by the elongated hole 31 (second guiding part). That is, respective circumferential lateral surfaces 41b of the slider main body 41 are in parallel to each other and are slidably in contact with the circumferential internal surfaces 31b of the elongated hole 31. In the oblique direction, the length L41 of the slider main body 41 is shorter than the length L31 of the elongated hole 31 (L41<L31). Specifically, the slider main body 41 (second guided part) slidably fit the elongated hole 31 in the oblique direction.

Figure 3:
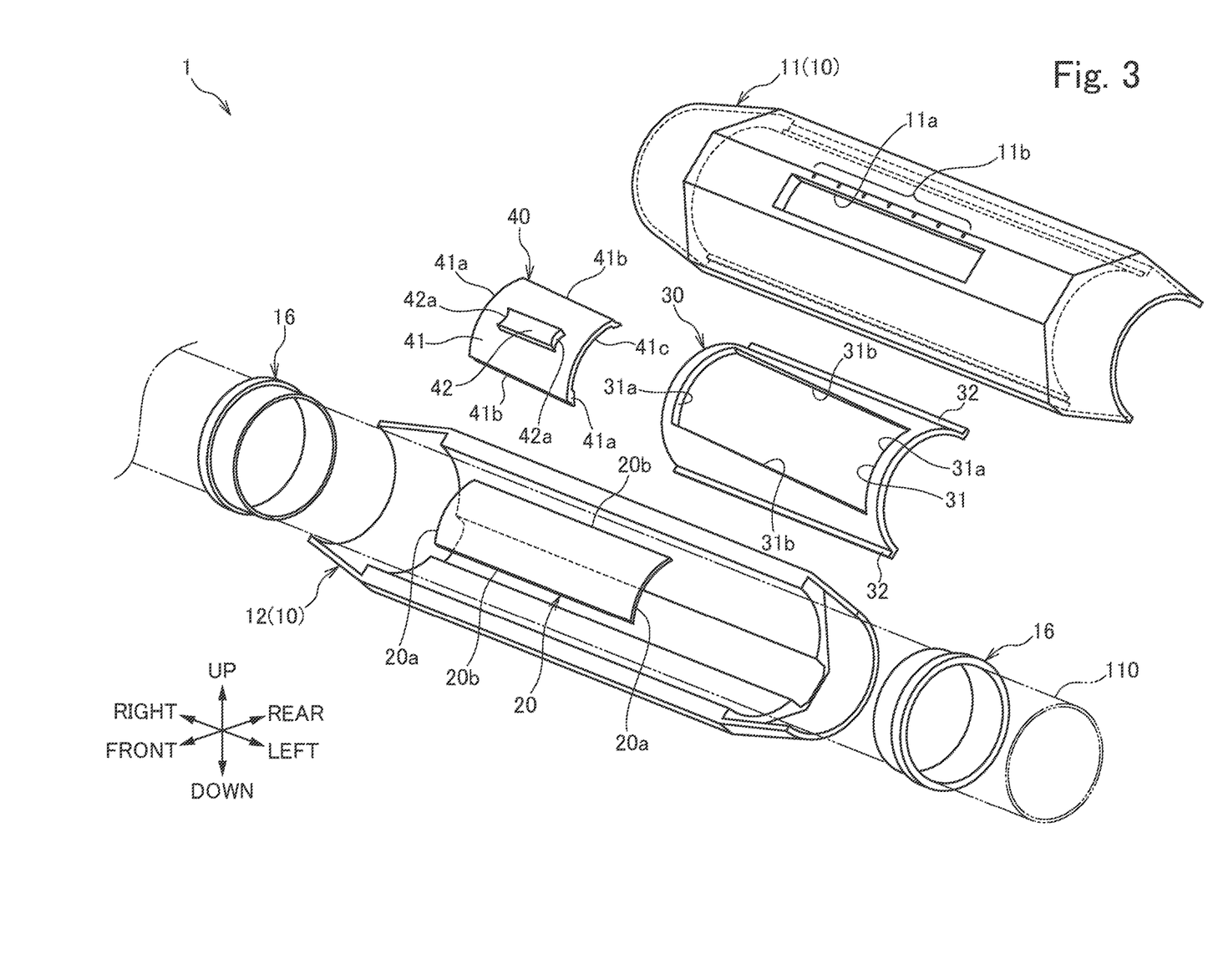
FIG. 3 is an exploded perspective view of the angle changeable apparatus according to this embodiment.
Figure 4:
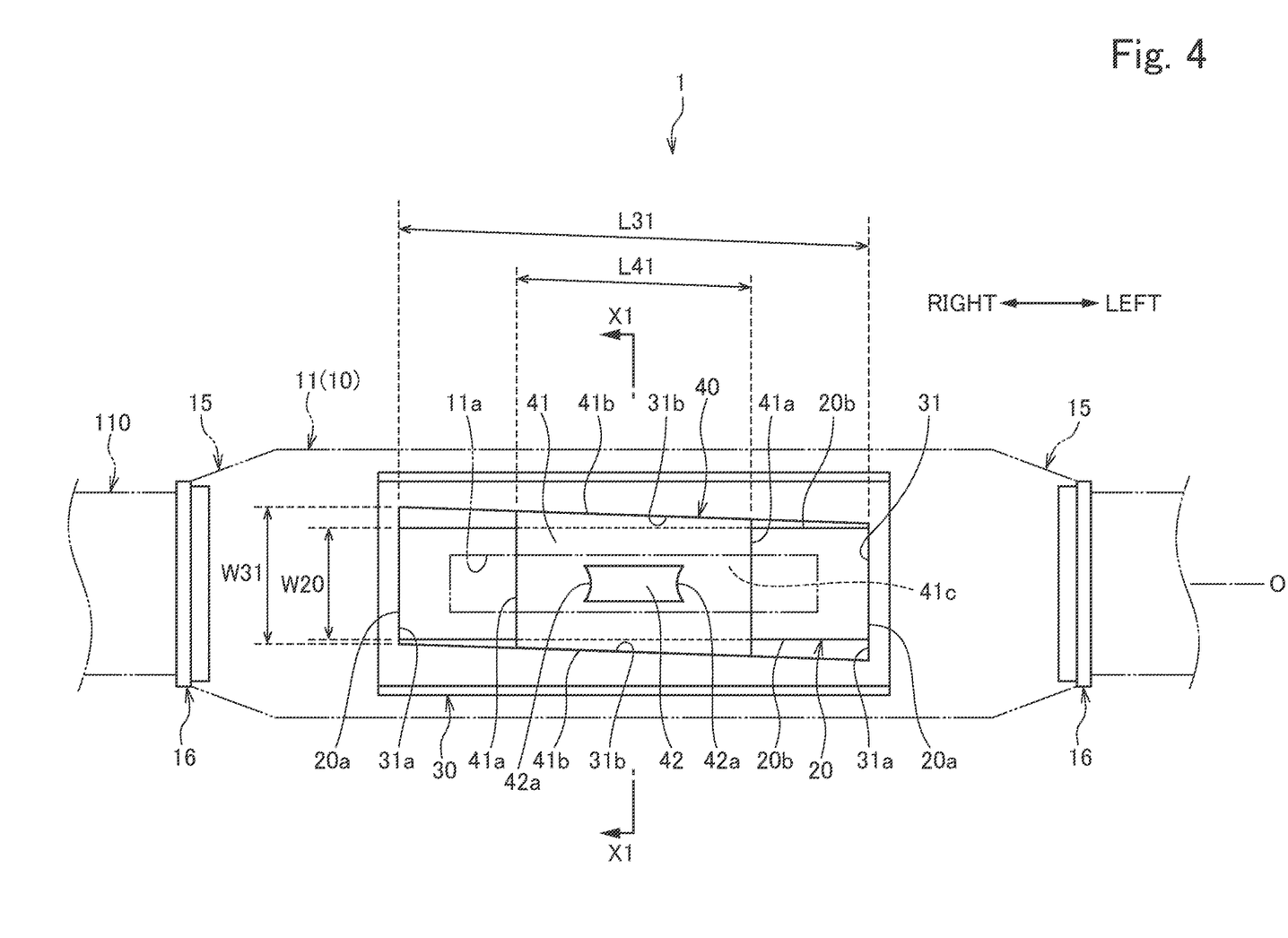
FIG. 4 is a lateral view of this angle changeable apparatus when viewed from the front upper side.

The inner periphery of the slider main body 41 has a groove 41c (first guided part) extending in the shaft direction (see FIGS. 3 and 5). The depth of the groove 41c is about half of the thickness of the slider main body 41. The groove 41c fits the shaft-side member 20. Accordingly, the slider main body 41 is guided by the shaft-side member 20 and can slide in the shaft direction. That is, the groove 41c is a first guided part guided by the shaft-side member 20.

Figure 6A:
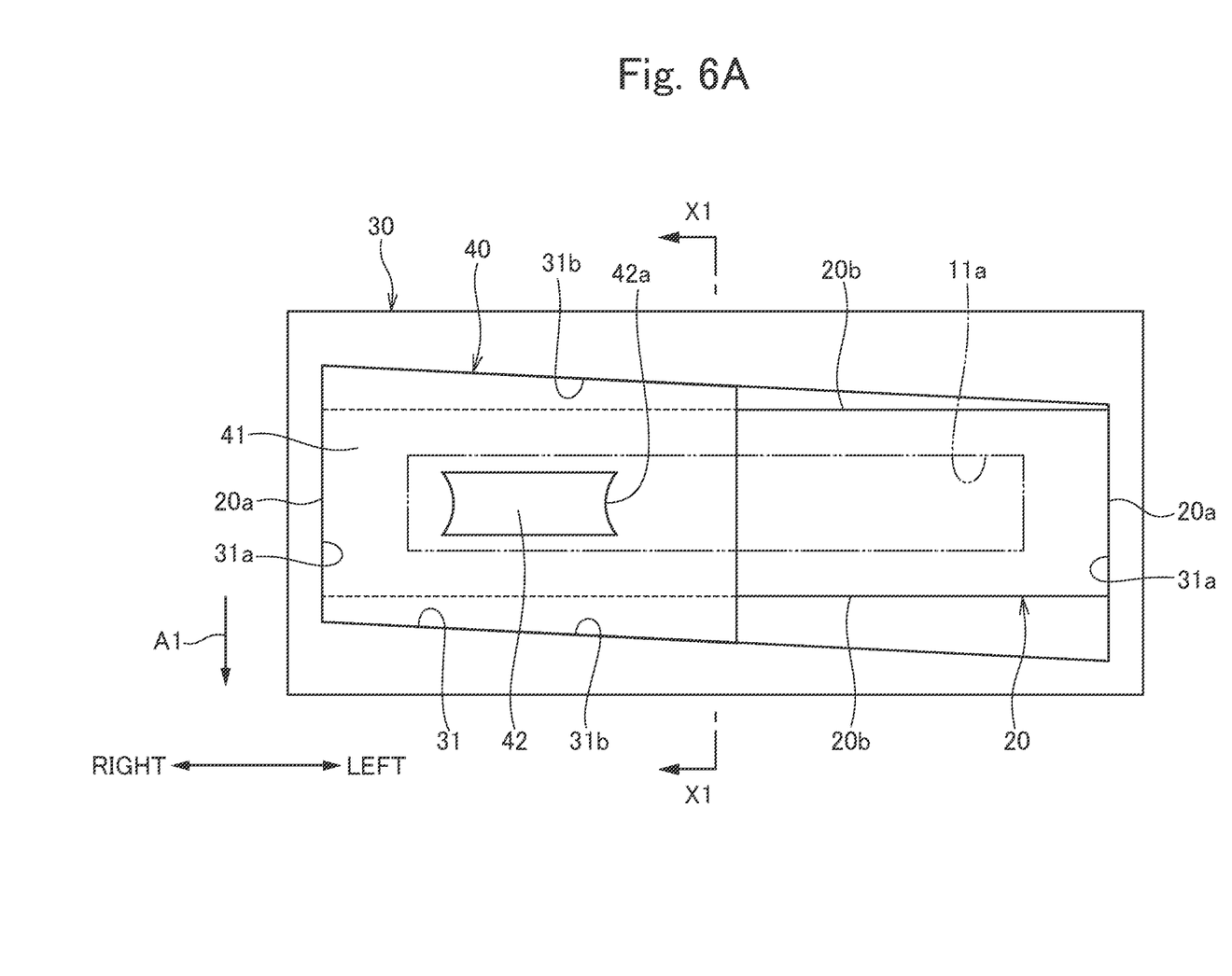
FIG. 6A is a side view illustrating how the angle changeable apparatus according to this embodiment works and shows a state in which a slider has been moved on the leading end side (right side).
Figure 6B:
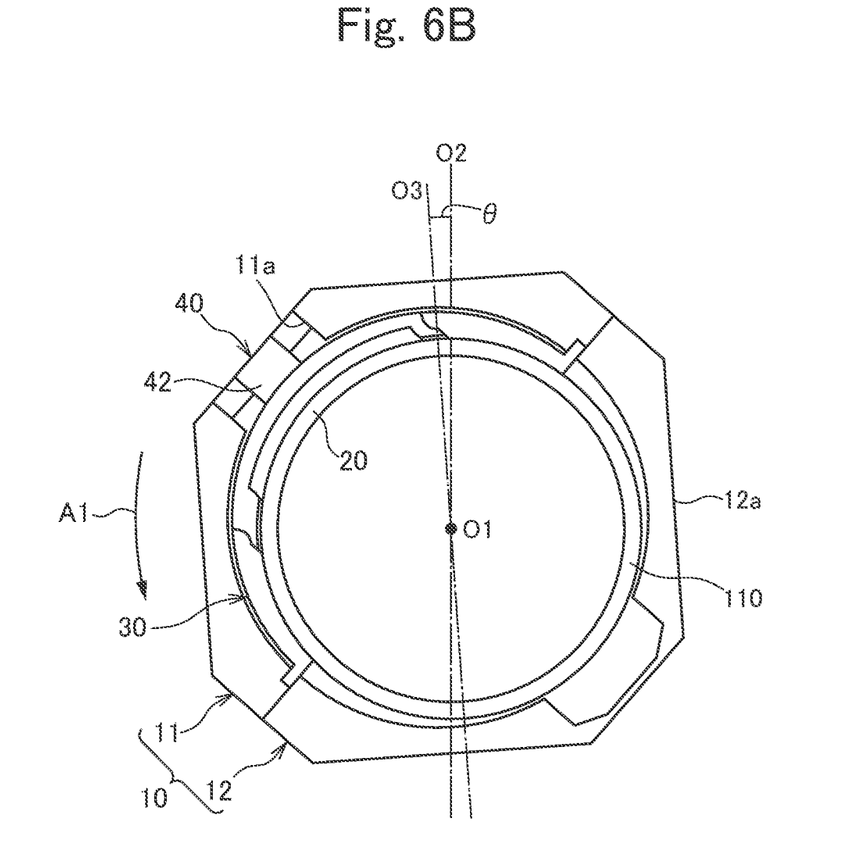
FIG. 6B is a cross-sectional view illustrating how the angle changeable apparatus according to this embodiment works and shows a state in which a sleeve-side member and a sleeve rotates counterclockwise relative to a shaft.
Figure 6C:
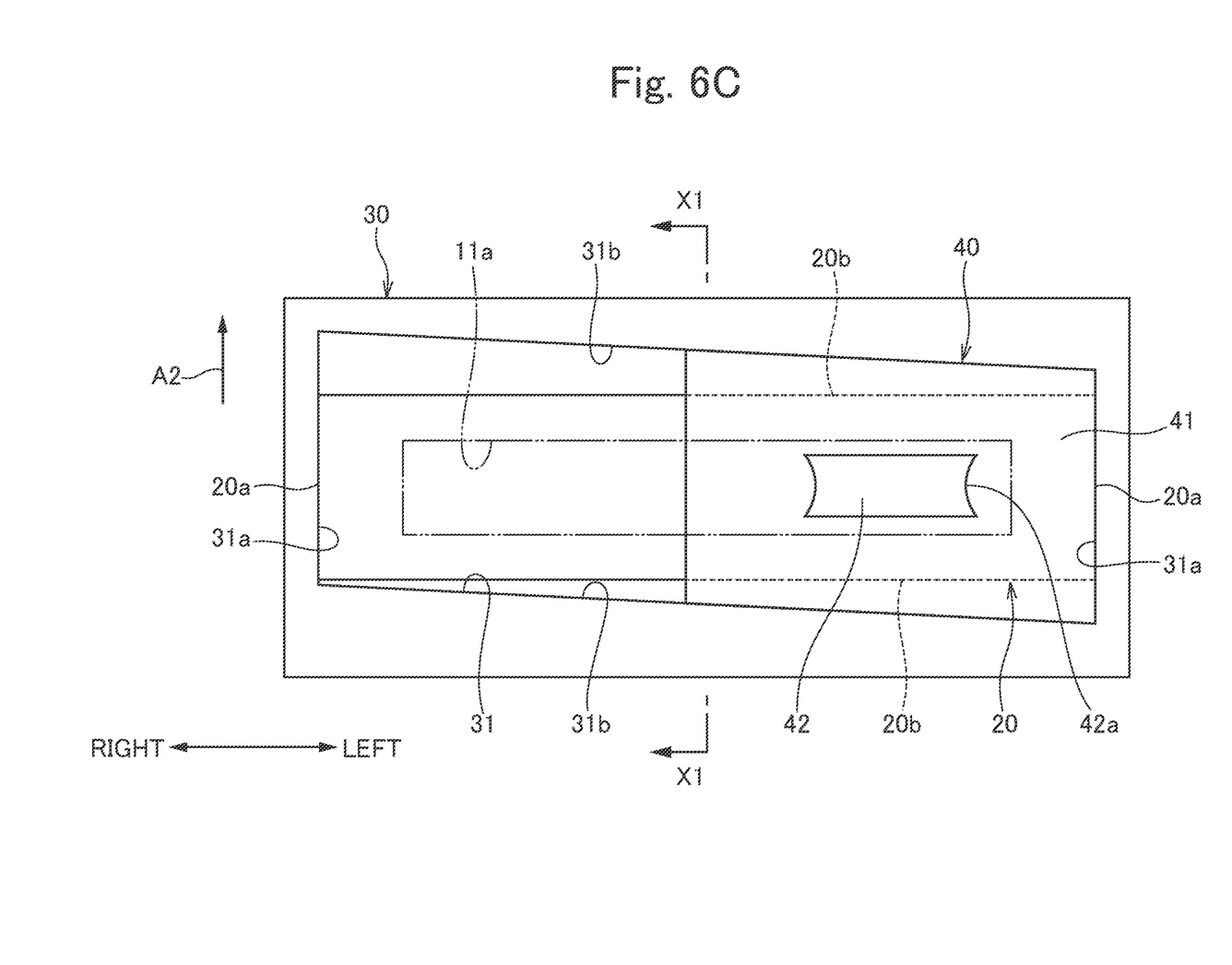
FIG. 6C is a side view illustrating how the angle changeable apparatus according to this embodiment works and shows a state in which a slider has been moved on the base end side (left side).

When one end face 41a of the slider main body 41 in the shaft direction comes into contact with the corresponding inner surface 31a of the elongated hole 31 in the shaft direction, movement of the slider main body 41 in the shaft direction is restricted (see FIGS. 6A and 6C). Note that the intermediate position of the shaft-side member 20 in the shaft direction is designed to be the neutral position of the slider main body 41 (see FIG. 4). Then, in the case where the slider main body 41 is at the neutral position, the angle θ between the blade width direction line O2 and the reference axis line O3 is set to 0 degrees (see FIGS. 4 and 5).

<Slider Grip Part>

The grip part 42 protrudes radially outward relative to the outer periphery of the slider main body 41 and is a protruding part that extends in the shaft direction and faces the outside through the window section 11a. When a rower grips the grip part 42 and makes the slider main body 41 (slider 40) slide, the slider 40 can slide in this configuration.

End faces 42a of the grip part 42 in the shaft direction each have a recessed curve that is somewhat concave inwardly in the shaft direction. This makes it easy to grip the grip part 42 by fingers. A gap is formed between the grip part 42 and the window section 11a in the circumferential direction. This allows the first half 11 not to interfere with the grip part 42 even if the first half 11 rotates relatively.

<Collar>

The collar 50 is an annular member attached to the outer periphery of the sleeve 10, and is a stopper member provided inwardly of the rowlock 200 in the shaft direction. In this way, the collar 50 is locked on the rowlock 200, so that the oar 100 does not come off from the rowlock 200.

The collar 50 is structured by combining a first half 51 and a second half 52, which are each shaped like a letter C (see FIG. 2). The state in which the first half 51 and the second half 52 are combined is maintained via a bolt(s) used to fasten the two and/or a metal band used to wound the two. In this way, the combination of the first half 51 and the second half 52 can somewhat reduce the diameter of the sleeve 10, so that the slider 40 is locked in the shaft direction.

<<Operation and Effects of Angle Changeable Apparatus or Oar>>

The following describes operation and effects of the angle changeable apparatus 1 or the oar 100.

<Slider: Slid on Leading End Side (Right Side)>

As shown in FIG. 6A, the slider 40 is made to slide toward the leading end side while the shaft 110 (shaft-side member 20) is fixed and the grip part 42 is gripped. Then, as shown in FIG. 6B, the sleeve-side member 30 and the sleeve 10 rotates counterclockwise relative to the shaft 110 when viewed in the shaft leading end direction (seethe arrow A1). That is, the blade width direction line O2 is inclined rearward relative to the reference axis line O3 (vertical direction).

<Slider: Slid on Base End Side (Left Side)>

Figure 6D:
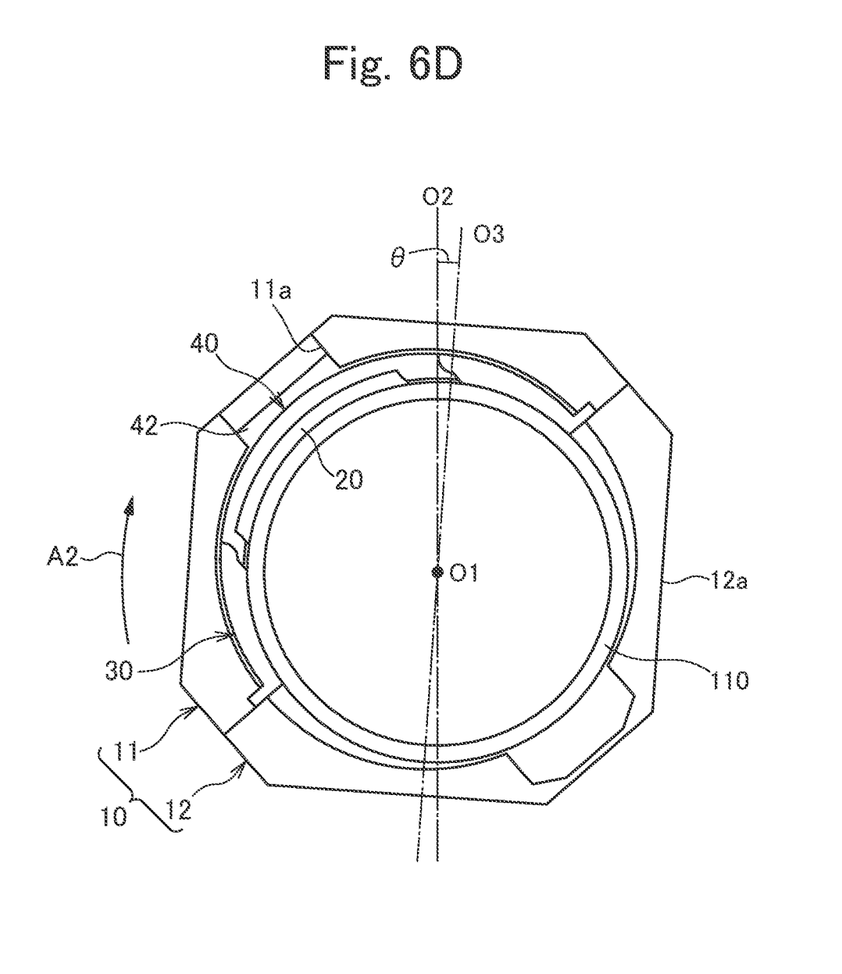
FIG. 6D is a cross-sectional view illustrating how the angle changeable apparatus according to this embodiment works and shows a state in which a sleeve-side member and a sleeve rotates clockwise relative to a shaft.

As shown in FIG. 6C, the slider 40 is made to slide toward the base end side while the shaft 110 (shaft-side member 20) is fixed and the grip part 42 is gripped. Then, as shown in FIG. 6D, the sleeve-side member 30 and the sleeve 10 rotates clockwise relative to the shaft 110 when viewed in the shaft leading end direction (see the arrow A2). That is, the blade width direction line O2 is inclined forward relative to the reference axis line O3 (vertical direction).

SUMMARY

In this way, the slider 40 is made to slide, so that the sleeve 10 and the shaft 110 are subject to relative rotation. This makes it possible to continuously and easily adjust and change, with precision and in a short time, the angle θ of the shaft 110 (blade 120) relative to the sleeve 10. Meanwhile, the operation of sliding the slider 40 can be performed on a boat, namely on water.

Modification Embodiment

Hereinabove, one embodiment of the invention has been described. However, the invention is not limited to the one embodiment, and may be modified, for example, as follows.

The above embodiment is an example of configuration in which the shaft-side member 20 (first guiding part) extends in the shaft direction and the elongated hole 31 (second guiding part) of the sleeve-side member 30 extends in the oblique direction relative to the shaft direction. Another example may involve a configuration in which the shaft-side member 20 (first guiding part) extends in an oblique direction relative to the shaft direction and the elongated hole 31 (second guiding part) extends in the shaft direction.

The above embodiment is an example of configuration in which the first guiding part (shaft-side member 20) is a projected section that protrudes radially outward and the first guided part is the groove 41c. Another example may involve a configuration in which the first guiding part is a groove formed at the shaft-side member 20 and the first guided part is a projected section that is formed protruding on the inner periphery of the slider main body 41.

Likewise, the configuration is exemplified in which the second guiding part is the elongated hole 31 and the second guided part is the slider main body 41. Another example may involve a configuration in which the second guiding part is a projected section that is formed protruding on the inner periphery of the sleeve-side member 30 and the second guided part is a groove formed on the outer periphery of the slider main body 41.

The above embodiment is an example of configuration in which each end face 20a of the shaft-side member 20 is slidably in contact with the corresponding inner surface 31a of the elongated hole 31 of the sleeve-side member 30 so that the sleeve-side member 30 is restricted in the shaft direction. Another example may involve a configuration in which the outer periphery of the shaft-side member 20 has a projected section in the circumferential direction and the inner periphery of the sleeve-side member 30 has a groove extending in the circumferential direction, so that the projected section slidably fits the groove.

The above embodiment is an example of configuration in which the entire shaft-side member 20 is the first guiding part. Another example may involve a configuration in which the outer periphery of the shaft-side member 20 has one or more projected sections (first guiding part) that extend in the shaft direction and protrude stepwise, so that the projected sections fit the groove 41c of the slider 40.

Likewise, an embodiment may be configured such that the outer periphery of the slider main body 41 has one or more projected sections (second guided part) that extend in the shaft direction and protrude stepwise so that the projected sections fit the elongated hole 31 of the sleeve-side member 30.

The above embodiment is an example of configuration of the angle changeable apparatus 1 in which the relative angle between the sleeve 10 and the shaft 110 of the oar 100 is changeable. However, the site where the angle changeable apparatus 1 is applicable is not limited to the above site. For example, it may be configured such that the angle changeable apparatus 1 is applied to a canoe paddle to be able to change the angle between a sleeve at a grip part and a shaft that is inserted into the sleeve and has a blade at the leading end.

The above embodiment is an example of configuration in which the diameter of the collar 50 is reduced to somewhat decrease the diameter of the sleeve 10 so that the slider 40 is locked in the shaft direction. Another example may involve a configuration in which an automatic locking mechanism for holding a cutter blade at a given position of a cutter is applied between the slider 40 and the shaft-side member 20 so that this automatic locking mechanism is used to hold the slider at the given position.

The above embodiment is an example of configuration in which the shaft-side member 20 extends in the shaft direction and the elongated hole 31 of the sleeve-side member 30 extends in the oblique direction relative to the shaft direction. Another example may involve a configuration in which the shaft-side member 20 and the elongated hole 31 each extend in an oblique direction relative to the shaft direction and the two are not in parallel.

Figure 7:
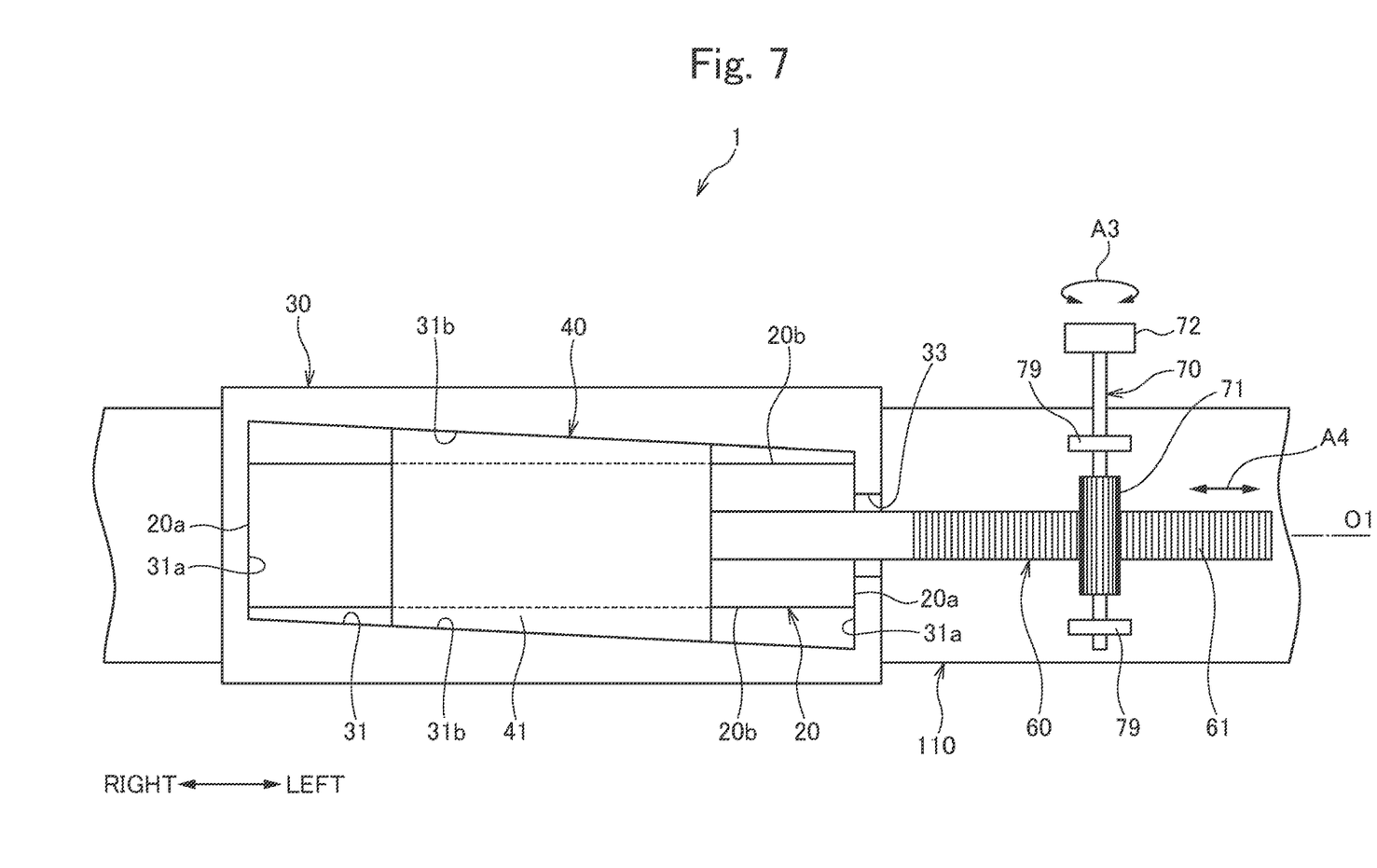
FIG. 7 is a lateral view of an angle changeable apparatus according to a modification embodiment when viewed from the front upper side.

The above embodiment is an example of configuration in which the grip part 42 is gripped so as to cause the slider 40 to slide. Another example may involve a configuration in which a rack-and-pinion mechanism shown in FIG. 7 is used to cause the slider 40 to slide. Note that in FIG. 7, the sleeve 10 is omitted.

This angle changeable apparatus 1 includes a rack 60 and a pinion 70.

The rack 60 is an approximately ⅛ cylinder and extends on the left side in the shaft direction relative to the slider main body 41 (slider 40). That is, the rack 60 and the slider main body 41 are integrated. About half on the left side of the outer periphery of the rack 60 has a rack gear 61. The rack 60 passes through a notch 33 that is provide on the left side of the sleeve-side member 30 and allows for communication between the elongated hole 31 and the outside. The circumferential width of the notch 33 is designed such that even if the sleeve-side member 30 and the shaft 110 are subject to relative rotation, the sleeve-side member 30 does not interfere with the rack 60.

The pinion 70 is a circular cylinder member extending substantially in the tangential direction of the shaft 110 and has a pinion gear 71 engaged with the rack gear 61. In the pinion 70, pinion bearings 79 and 79 are used to rotatably support the shaft 110. One end of the pinion 70 has a grip part 72 with a larger diameter. The grip part 72 faces the outside through a through-hole (not shown) formed at the first half 11 (sleeve 10).

Next, when a rower grips the grip part 72 to rotate the pinion 70 (see the arrow A3), the rack 60 and the slider 40 slide toward the left/right side corresponding to the rotational direction (see the arrow A4). As a result, the shaft 110 and the sleeve 10 are subject to relative rotation. Note that the size of the through-hole is designed such that even if the shaft 110 and the sleeve 10 are subject to relative rotation, the sleeve 10 does not interfere with the grip part 72.

Figure 8:
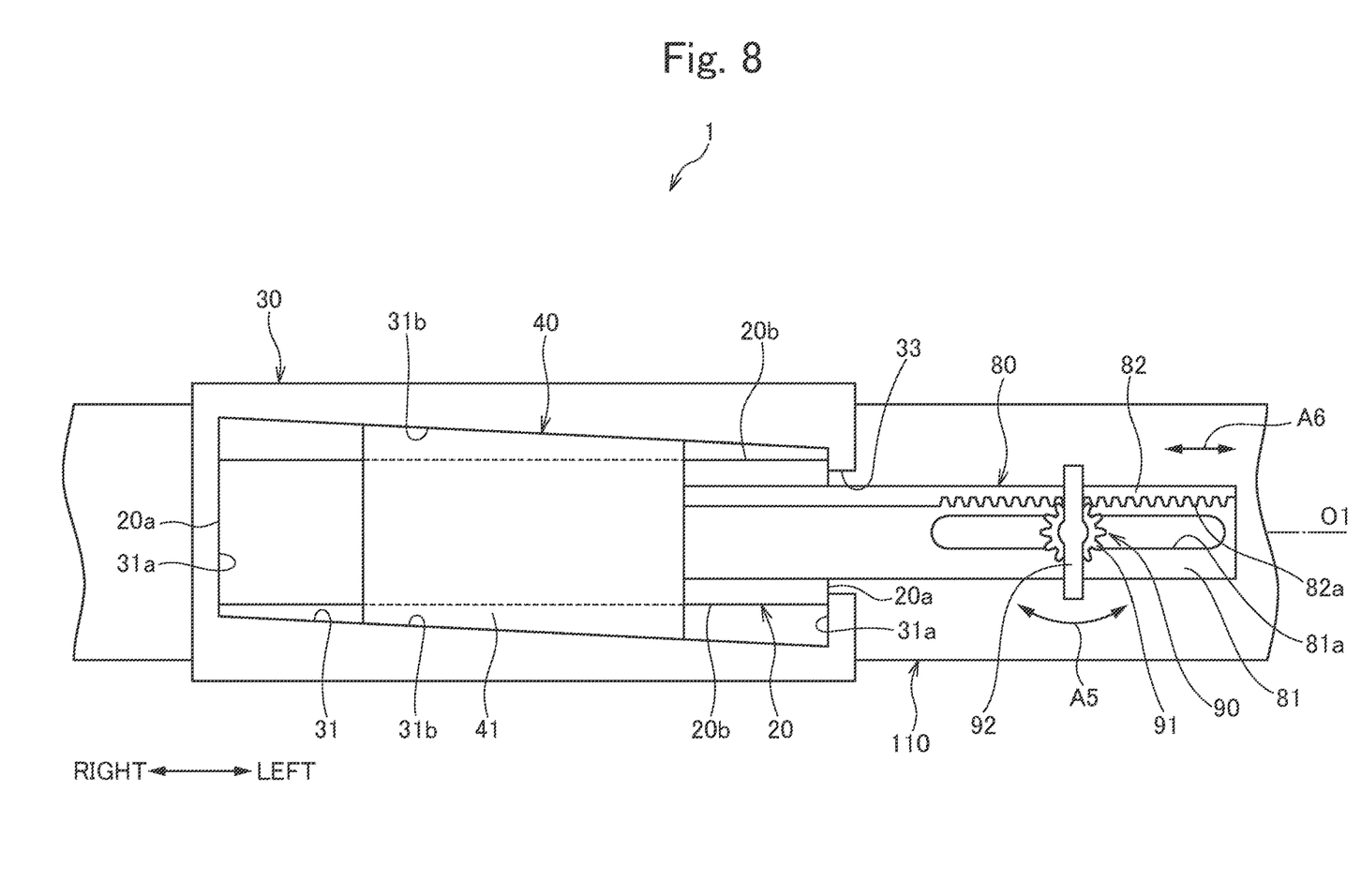
FIG. 8 is a lateral view of an angle changeable apparatus according to a modification embodiment when viewed from the front upper side.

Another example may involve a configuration in which a rack-and-pinion mechanism shown in FIG. 8 is used to cause the slider 40 to slide. Note that in FIG. 8, the sleeve 10 is omitted.

This angle changeable apparatus 1 includes a rack 80 and a pinion 90.

The rack 80 extends, through a notch 33, on the left side in the shaft direction relative to the slider main body 41 (slider 40). The rack 80 is shaped like a letter L in a cross sectional view in the shaft direction, and is provided with: an approximately ⅛ cylindrical lateral wall 81: and a vertical wall 82 that stands rearwardly of the lateral wall 81 and extends in the shaft direction. The lateral wall 81 has an elongated hole 81a extending in the shaft direction, and the elongated hole 81a has the pinion 90 inserted movably. The front side of the vertical wall 82 has a rack gear 82a.

The pinion 90 is a circular cylinder member extending substantially in the radial direction and has a pinion gear 91 engaged with the rack gear 82a. The inner side of the pinion 90 in the radial direction is inserted into a pinion bearing (not shown) fixed to the outer periphery of the shaft 110, and is rotatably supported. The outer side of the pinion 90 in the radial direction faces the outside through a through-hole (not shown) formed at the first half 11 (sleeve 10). A handle 92 (grip part) is mounted on this portion.

Next, when a rower grips the handle 92 to rotate the pinion 90 (see the arrow A5), the rack 80 and the slider 40 slide toward the left/right side corresponding to the rotational direction (see the arrow A6). As a result, the shaft 110 and the sleeve 10 are subject to relative rotation.

REFERENCE SIGNS LIST

1 Angle changeable apparatus
10 Sleeve
20 Shaft-side member (First guiding part; Projected section)
20a End face
30 Sleeve-side member
31 Elongated hole (Second guiding part)
31a Inner surface
40 Slider
41a Slider main body (Second guided part)
41c Groove (First guided part)
42 Grip part
100 Oar
110 Shaft

The invention claimed is:

1. An angle changeable apparatus for variably changing an angle of a shaft inserted in a sleeve and passing through the sleeve, comprising:
   a shaft-side member fixed to the shaft;
   a sleeve-side member fixed to the sleeve; and
   a slider configured to slide between the shaft-side member and the sleeve-side member, wherein
   one of the shaft-side member or the sleeve-side member has a first guiding part extending in a shaft direction,
   the other of the shaft-side member or the sleeve-side member has a second guiding part extending in an oblique direction relative to the shaft direction,
   the slider has a first guided part guided by the first guiding part and a second guided part guided by the second guiding part, and
   when the slider slides, the shaft-side member and the sleeve-side member are subject to relative rotation so that an angle of the shaft relative to the sleeve is changeable.

2. The angle changeable apparatus according to claim 1, wherein the one is the shaft-side member;
   the first guiding part is a projected section extending in the shaft direction while protruded radially outward;
   the first guided part is a groove fit for the first guiding part;
   the other is the sleeve-side member;
   the second guiding part is an elongated hole formed at the sleeve-side member in an oblique direction; and
   the second guided part is slidably inserted in the elongated hole.

3. The angle changeable apparatus according to claim 2, wherein each inner surface of the elongated hole in the shaft direction extends in a circumferential direction,
   each end face of the first guiding part is slidably in contact with the corresponding inner surface in the circumferential direction.

4. The angle changeable apparatus according to claim 2 or 3, further comprising
   a sleeve having a window section extending in the shaft direction and fixed outwardly of the sleeve-side member, wherein the slider has a grip part protruding radially outward relative to an outer periphery thereof, and the grip part faces an outside through the window section.

5. The angle changeable apparatus according to claim 2 or 3, further comprising:

a rack having a rack gear and extending in the shaft direction relative to the slider; and a pinion having a pinion gear engaged with the rack gear.

6. An oar comprising:

the angle changeable apparatus according to any one of claims 1 to 3;

a shaft having the shaft-side member attached; and a blade fixed to a leading end of the shaft.

* * * * *